United States Patent
Im

[11] Patent Number: 5,917,985
[45] Date of Patent: Jun. 29, 1999

[54] OPTICAL ATTENUATOR

[75] Inventor: Young-min Im, Pyungtaek, Rep. of Korea

[73] Assignee: Korea Electronic Technology Institute, Pyungtaek, Rep. of Korea

[21] Appl. No.: 08/756,411

[22] Filed: Nov. 27, 1996

[30] Foreign Application Priority Data

Dec. 30, 1995 [KR] Rep. of Korea ........................ 95-69790
Jun. 3, 1996 [KR] Rep. of Korea ........................ 96-19628

[51] Int. Cl.$^6$ .................................................. G02B 6/32
[52] U.S. Cl. ............................. 385/140; 385/33; 385/61
[58] Field of Search .............................. 385/33–35, 61, 385/79, 140

[56] References Cited

U.S. PATENT DOCUMENTS

| | | | |
|---|---|---|---|
| 4,557,557 | 12/1985 | Gleason et al. | 385/140 |
| 4,737,004 | 4/1988 | Amitay et al. | 385/33 X |
| 4,989,938 | 2/1991 | Tamulevich | 385/33 |
| 5,011,254 | 4/1991 | Edwards et al. | 385/33 |
| 5,066,094 | 11/1991 | Takahashi | 385/140 X |
| 5,319,733 | 6/1994 | Emmons et al. | 385/140 |
| 5,321,790 | 6/1994 | Takahashi et al. | 385/140 |

FOREIGN PATENT DOCUMENTS

| | | | |
|---|---|---|---|
| 0083278 | 7/1983 | European Pat. Off. | 385/140 |
| 54-2143 | 1/1979 | Japan | 385/140 |

*Primary Examiner*—John D. Lee
*Attorney, Agent, or Firm*—Morgan & Finnegan, L.L.P.

[57] ABSTRACT

There is provided an optical attenuator for reducing back-reflection by forming the sections of optical fibers of the optical attenuator into non-spherical lenses. For this purpose, in an optical attenuator for attenuating a predetermined optical signal, the sections of first and second optical fibers spaced by a predetermined distance to face each other are formed into non-spherical lenses. Thus, optical attenuation precision is improved and impacts of back-reflection is avoided.

17 Claims, 5 Drawing Sheets

OPTICAL ATTENUATOR

BACKGROUND OF THE INVENTION

The present invention relates to an optical attenuator, and more particularly, to an optical attenuator of which the optical fibers have sections formed into non-spherical lenses to reduce back-reflection.

Generally in an optical transmission system, an optical signal is output with high power and attenuated by an optical attenuator for proper use in a receiver side. Such an optical attenuator for attenuating a high-power optical signal may be used for adjustment, correction, and various measurements of an optical communications system, or compensation for local losses of an optical fiber transmission line. It can also find its applications in various optical devices.

Many kinds of optical attenuators have been developed for such various applications, of which one type is illustrated in FIGS. 1A and 1B.

Referring to FIG. 1A, to attenuate an optical signal, a conventional optical attenuator has two optical fibers spaced by a predetermined distance d1 and an air layer 4 formed between both the optical fibers. That is, in this optical attenuator, an optical fiber inputting unit including a first optical fiber 1 and a first supporting holder 2 is detached from an optical fiber outputting unit including a second optical fiber 5 and a second supporting holder 6 by the predetermined distance d1, and an air layer 4, i.e., an air gap intervenes between them. Thus, the optical fiber inputting and outputting units are arranged with the air layer 4 therebetween in a sleeve 9 of a predetermined shape.

In such an optical attenuator as constituted above, since an optical signal emitted from the first optical fiber 1 is diverged in the air layer 4, only part of the optical signal impinges on the second optical fiber 5, thus resulting in optical attenuation. Here, Fresnel reflection, namely, back-reflection occurs at the boundary surface of the first optical fiber 1 and the air layer 4, causing a reflection loss of about 14.4 dB. Thus, the optical attenuator has limitations for use in a practical optical system. Fresnel reflection, i.e., back-reflection indicates the phenomenon in which when an optical signal passes through two materials of different refractive indices, it is partially reflected at the boundary surface of both the materials. As shown in FIG. 1B, for example, assuming that when an optical signal $P_o$ is vertically incident from a glass into the air, the amount of an optical signal reflected from their boundary surface, that is, the amount of back-reflection, is $P_r$, the amount of a transmitted optical signal is $P_t$, the refractive index n1 of the glass is 1.47, and the refractive index of the air is 1, the reflexibility R of the vertically incident light is calculated by $$R = \left(\frac{n1 - n0}{n1 + n0}\right)^2 = 3.6\%$$

Here, the reflection loss $P_r$ of the reflected optical signal is calculated by $$P_r = -10\log_{10}R = 14.4 \text{ dB}$$

As a result, the optical attenuator having the air layer between the two optical fibers shows the drawback of a reflection loss of 14.4 dB or above due to Fresnel reflection, and thus a great likelihood of causing serious errors in a light source of a practical optical system.

FIGS. 2A and 2B illustrate an example of an optical attenuator which reduces back-reflection caused by Fresnel reflection from the vertical section of an optical fiber. The optical attenuator of FIG. 2A is disclosed in Japanese Laid-Open Patent Publication Showha 59-94702. This optical attenuator performs optical attenuation with two optical fibers and optical supporting holders having inclined portions. It has an optical fiber inputting unit including a first optical fiber 12 and a first supporting holder 13, and an optical fiber outputting unit including a second optical fiber 16 and a second supporting holder 15, and an optical attenuating filter 14 having a predetermined thickness d2 inserted between the optical inputting and outputting units, all of which are arranged in a predetermined sleeve 19.

In this optical attenuator, an optical signal emitted from the first optical fiber 12 is attenuated in the optical attenuating filter 14 and reaches the second optical fiber 16. To reduce back-reflection of the optical signal, the first optical fiber 12, the first supporting holder 13, the second optical fiber 16, and the second supporting holder 15 are ground to have slopes, respectively. That is, referring to FIG. 2B, when light A travelling through the first optical fiber is emitted from the inclined section of the first optical fiber, part of the optical signal becomes transmitted light B. and the rest thereof becomes reflected light C at the inclined section. The reflected light C travels relying on a reflection rule, as shown, and thus does not interfere with the travelling light A. Therefore, with an end portion of the optical fiber formed into a slope, the amount of back-reflection caused by Fresnel reflection or back-reflection in the optical fiber having a vertical section of FIG. 1A can be reduced.

However, such an optical attenuator having inclined sections as described above is costly due to many processes accompanying the grinding of the inclined sections.

SUMMARY OF THE INVENTION

To circumvent the above problems, the object of the present invention is to provide an optical attenuator which is improved in terms of precision and free of impacts of back-reflection by forming a section of an optical fiber to be non-spherical.

To achieve the above object, there is provided an optical attenuator having a first optical fiber and a second optical fiber, for attenuating a predetermined optical signal, wherein the sections of the first and second optical fibers arranged to face each other are each formed into non-spherical lenses.

It is preferable in a first embodiment of the present invention that the non-spherical surfaces of the first and second optical fibers are AR-coated.

It is preferable in a second embodiment of the present invention that the axes of the first and second optical fibers may and may not be in alignment with each other.

It is preferable in a third embodiment that aligning means is provided to align the first and second optical fibers to be detached from each other and thus to form an air gap.

It is preferable in a fourth embodiment that the aligning means includes a first supporting holder and a second supporting holder for holding the first and second optical fibers, respectively, and an aligning sleeve for surrounding the first and second supporting holders to align the optical fibers and the supporting holders.

It is preferable in a fifth embodiment that adjusting means is provided to adjust the distance between the non-spherical lenses of the first and second optical fibers by advancing and retreating the second supporting holder along an optical axis in the aligning sleeve.

It is preferable in a sixth embodiment that rotating means is provided to rotate the second supporting holder in the aligning sleeve.

It is preferable in a seventh embodiment that the aligning means comprises a first supporting holder and a second supporting holder for holding the first and second optical fibers, respectively, a first sleeve for surrounding a portion of the first supporting holder to include the non-spherical lens of the first optical fiber, and a second sleeve for surrounding a portion of the second optical fiber to exclude the non-spherical lens of the second optical fiber, so that the second supporting holder is inserted into the first sleeve.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1A:
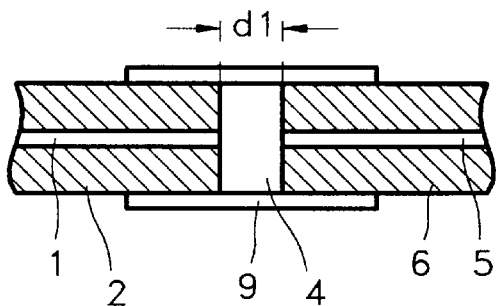
FIGS. 1A and 1B are schematic views of a conventional optical attenuator.
Figure 1B:
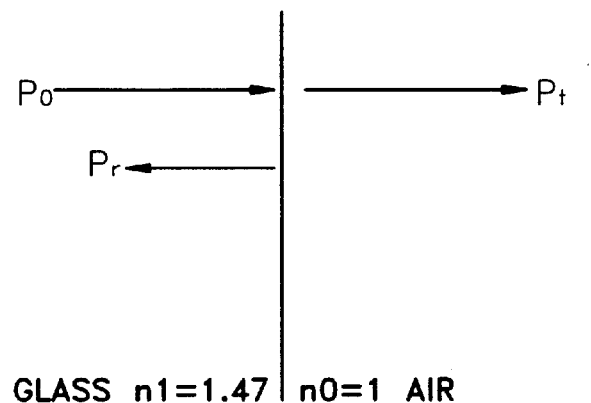
Figure 2A:
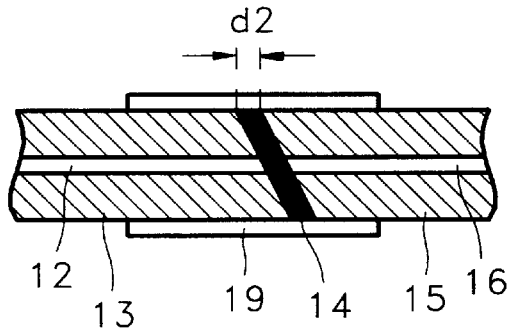
FIGS. 2A and 2B are schematic views of another example of the conventional optical attenuator.
Figure 2B:
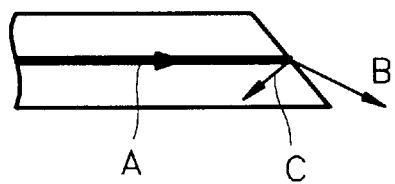
Figure 3A:
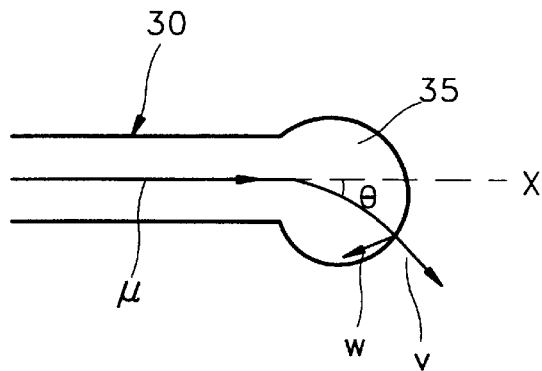
FIGS. 3A and 3B are schematic views of nonspherical lenses of optical fibers used in an optical attenuator of the present invention, for explaining the operation of the non-spherical lenses.
Figure 3B:
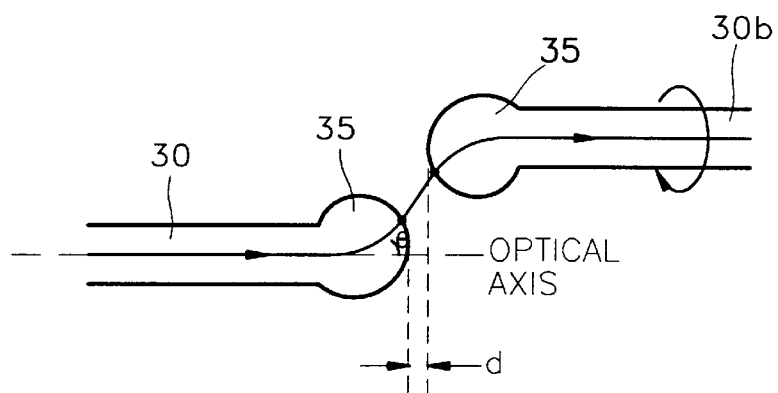

An optical attenuator of the present invention serves to reduce back-reflection by forming sections of optical fibers, which constitute optical inputting and outputting units, into non-spherical lenses. As shown in FIGS. 3A and 3B, if the section of an optical fiber 30 is formed into a non-spherical lens 35, light (or an optical signal) travelling along an optical fiber core is tilted from the non-spherical lens 35 at an angle of $\theta$ with respect to an optical axis x. Part of the light $\mu$ tilted from the non-spherical lens 35 is reflected from the boundary surface of the non-spherical lens 35, and the rest thereof becomes transmitted light v. Here, the light w reflected from the boundary surface of the non-spherical lens 35 does not return to the path of the travelling light $\mu$, thus preventing back-reflection. Further, when the light travelling along the core of the optical fiber 30 is emitted from the non-spherical lens 35 to air, its numerical aperture NA is reduced. In FIGS. 3A and 3B, cores and clads forming optical fibers are not shown.

Therefore, back-reflection can be prevented and insertion-induced light loss can be minimized by aligning optical fibers each having the non-spherical lens of FIG. 3A from each other, as shown in FIG. 3B. That is, if an optical fiber 30b arranged as shown in FIG. 3B is rotated based on a predetermined axis, or the distance d is changed along the length of the optical fibers 30a and 30b, an optical attenuator enabling a predetermined optical attenuation can be realized.

Figure 4:
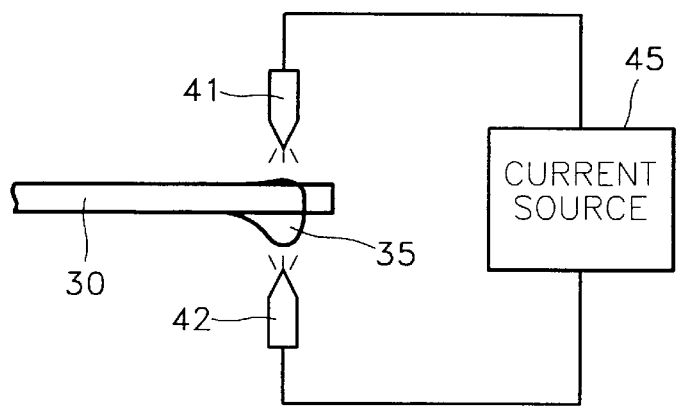
FIG. 4 is a schematic view of an example of a device for manufacturing the non-spherical lens of an optical fiber in the optical attenuator of the present invention.

The above method for manufacturing the non-spherical lens on the section of the optical fiber can be simply performed by a device shown in FIG. 4. That is, when the optical fiber 30 is positioned between both arc rods 41 and 42 vertically disposed and a predetermined current is applied from a current source 45 to the arc rods 41 and 42, a predetermined portion of the optical fiber 30 is melted by arc heat and the melted optical fiber material hangs down due to gravitation. When the optical material is melted at a predetermined size and hangs down, arc heating is stopped and the melted optical fiber material is cooled for a predetermined time, thereby obtaining an optical fiber having the intended non-spherical lens 35. Here, though the optical fiber is melted by arc heat in this exemplary application, laser machining or anything for melting the optical fiber can be used. In fabrication of the non-spherical lens of the optical fiber, the size of the non-spherical lens 35 and the angle $\theta$ of the non-spherical surface vary with the amount of current flowing in the arc rods 41 and 42, time, and the position of the optical fiber 30. As the value of $\theta$ of the non-spherical surface increases, back-reflection markedly decreases.

Preferred embodiments of the optical attenuator of the present invention will be described, which can be manufactured by the above device and includes optical fibers having non-spherical lenses of the above characteristics.

Figure 5:
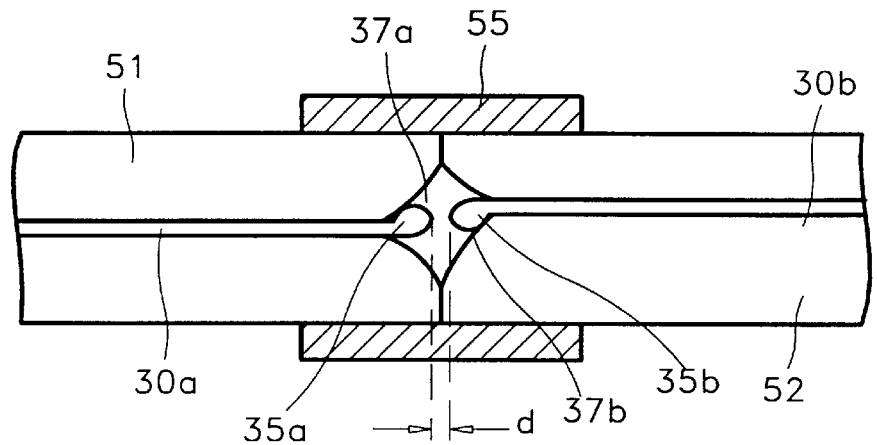
FIGS. 5 through 8 are schematic views of embodiments of the optical attenuator of the present invention.

FIG. 5 illustrates a fixed optical attenuator for attenuating an input optical signal at a predetermined rate. The fixed optical attenuator has a first optical fiber 30a acting as an optical inputting unit, a second optical fiber 30b acting as an optical outputting unit, first and second holders 51 and 52 for holding the first and second optical fibers 30a and 30b, respectively, and an alignment sleeve 55 for fixedly aligning predetermined portions of the first and second holders 51 and 52, while surrounding them. Here, AR coating 37a and 37b performed on at least one of the surfaces of the non-spherical lenses 35a and 35b of the first and second optical fibers 30a and 30b can further reduce back-reflection from the lenses 35a and 35b.

In the optical attenuator as constituted above, an optical attenuation rate when the optical signal reaches the non-spherical lens 35b of the second optical fiber 30b via the non-spherical lens 35a of the first optical fiber 30a is determined by the distance d between the first and second optical fibers 30a and 30b, and a disparity in the direction of the non-spherical axes of both the optical fibers. In addition, the optical attenuation rate can vary with the presence or absence of the AR coating 37a and 37b on the surfaces of the nonspherical lenses 35a and 35b.

Figure 6:
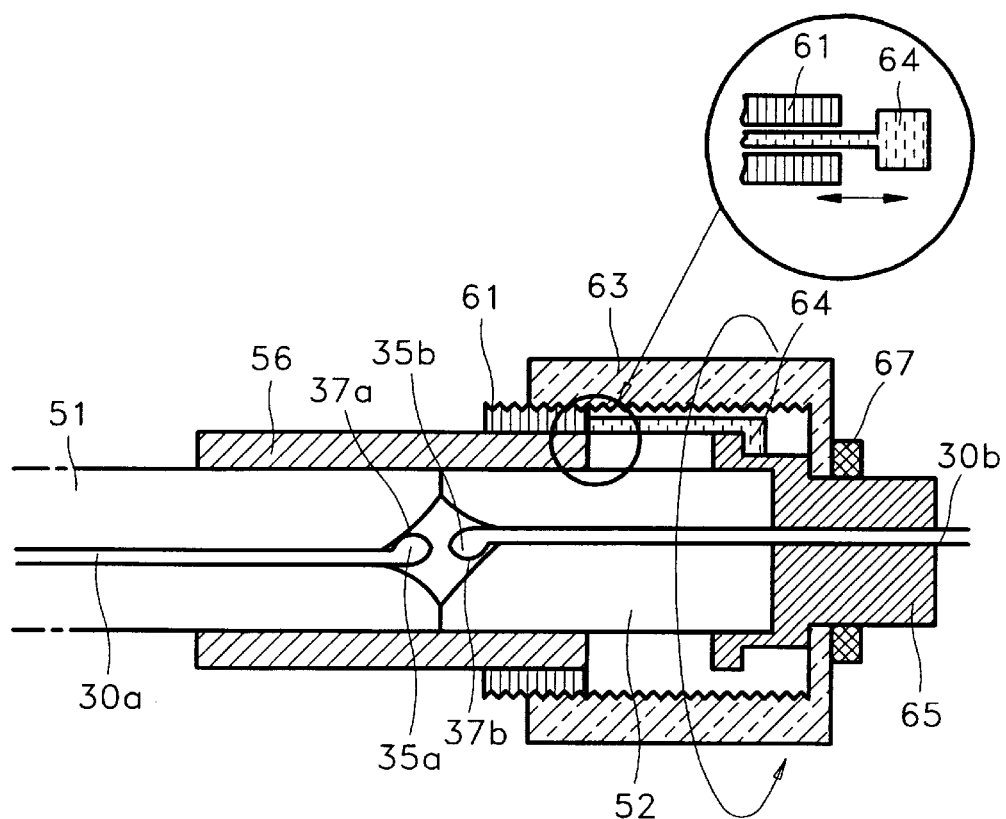

FIG. 6 illustrates a variable optical attenuator for attenuating an input optical signal in several stages. The optical attenuator includes the first and second optical fibers 30a and 30b having the non-spherical lenses 35a and 35b on end portions thereof, and the first and second holders 51 and 52, which are shown in FIG. 5, and an alignment sleeve 56 for aligning the first and second optical fibers 30a and 30b so that the first holder 51 is fixed and the second holder 52 slides in contact with the inner wall of the alignment sleeve 56. Here, AR coating 37a and 37b are preferably performed on the surfaces of the non-spherical lenses 35a and 35b. The variable optical attenuator of the present invention has a male screw portion 61 having buttless threads on the outer surface thereof, a female screw portion 63 having buttless threads formed on the inner surface thereof to be engaged with the buttless threads of the male screw portion 61, a flange 65 intervening between the second optical fiber 30b and the female screw portion 63, for fixing the second holder 52 and the second optical fiber 30b to be incorporated. Here, it is preferable that the female screw portion 63 and the flange 65 are not in contact. In addition, there are further provided a fixing ring 67 for advancing and retreating the flange 65 and a rotation preventing key 64 for preventing the rotation of the flange 65, when the female screw portion 63 is rotated on the male screw portion 61 and the flange 65.

The rotation preventing key 64 advances and retreats through a through hole formed in the male screw portion 61 according to the rotation of the female screw portion 63, as shown.

In the variable optical attenuator as constituted above according to the present invention, when the female screw portion 63 is rotated on the male screw portion 61, the second optical fiber 30b, the second holder 52, and the flange 65 just move back and forth without rotation by the action of the fixing ring 67 and the rotation preventing key 64. Here, the second holder 52 advances and retreats, while sliding in the alignment sleeve 56. Accordingly the distance d between the first and second optical fibers 30a and 30b and thus an optical attenuation rate vary with the rotation of the female screw portion 63.

Figure 7:
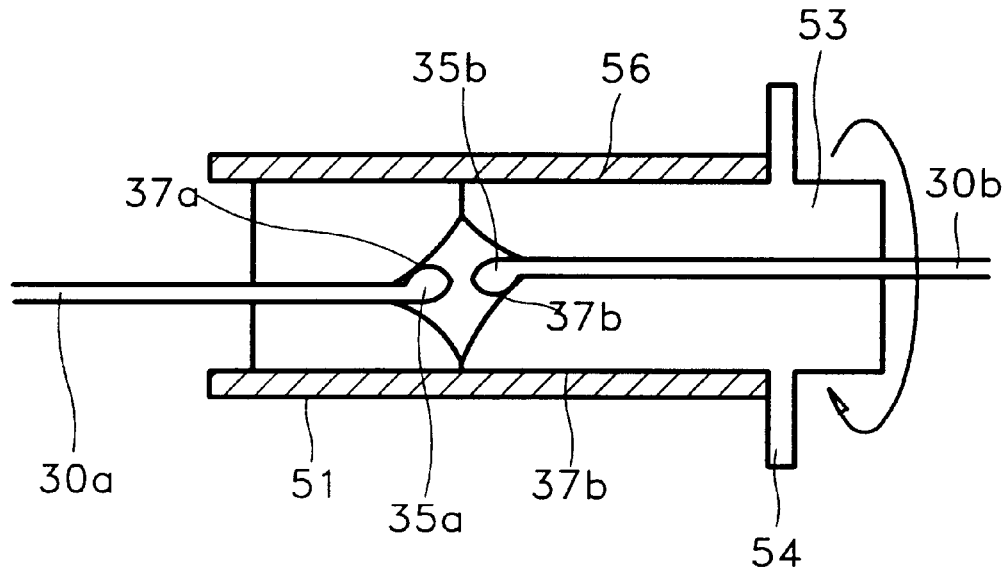

FIG. 7 illustrates a variable optical attenuator for attenuating an input optical signal at a predetermined rate like the optical attenuator of FIG. 6. The variable optical attenuator, as shown in FIG. 7, has the first and second optical fibers 30a and 30b having the non-spherical lenses 35a and 35b, the first and second holders 51 and 53, and the alignment sleeve 56 for aligning the first and second optical fibers 30a and 30b so that the first holder 51 is fixed and the second holder 53 rotates in contact with the inner wall of the alignment sleeve 56. Here, a rotating handle 54 is formed in the second holder 53 to facilitate rotation of the second holder 53 in the aligning sleeve 56. Preferably, AR coating 37a and 37b is performed on the surfaces of the non-spherical lenses 35a and 35b.

In the variable optical attenuator as constituted above, when the handle 54 of the second holder 53 is rotated, the second optical fiber 35b fixed by the second holder 53 is also rotated. Therefore, the alignment positions of the non-spherical lenses 35a and 35b of the first and second optical fibers 30a and 30b and thus an optical attenuation rate vary with the rotation of the second optical fiber 30b.

Figure 8:
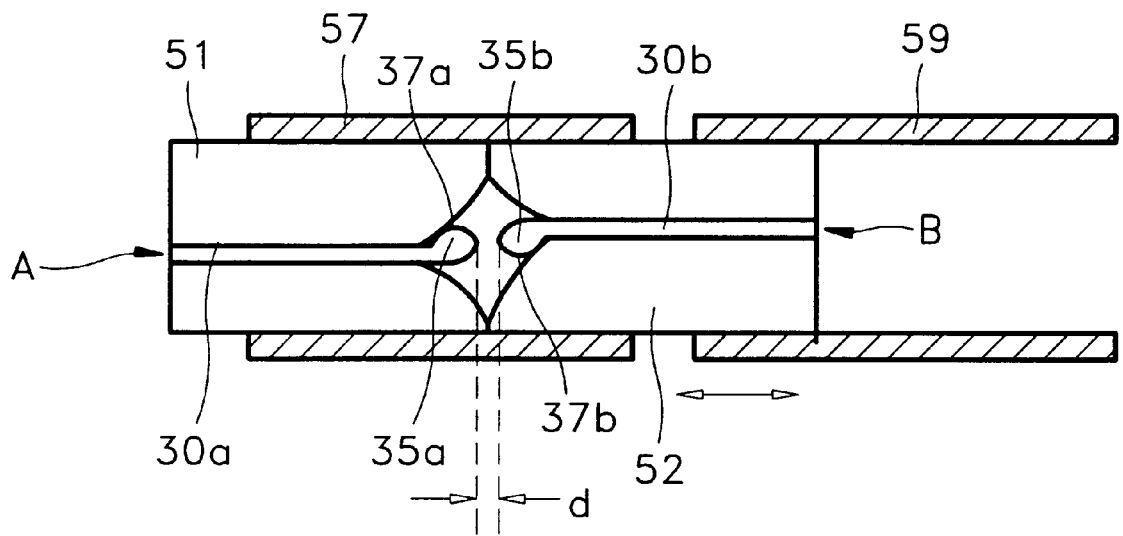

FIG. 8 illustrates a connector incorporated optical attenuator which can act as a fixed or variable optical attenuator. This optical attenuator, as shown in FIG. 8, has the first and second optical fibers 30a and 30b having the non-spherical lenses 35a and 35b on end portions thereof, and the first and second holders 51 and 52. It also includes a first sleeve 57 for surrounding a portion of the first holder 51 to position the non-spherical lens 35a of the first optical fiber 30a in the first sleeve 57, and a second sleeve 59 for surrounding a portion of the second holder 52 to position the non-spherical lens 35b of the second optical fiber 30b outside the second sleeve 59.

The connector incorporated optical attenuator of the present invention as constituted above functions as an optical attenuator having a predetermined optical attenuation rate by aligning the non-spherical lenses 35a and 35b of the first and second optical fibers 30a and 30b and adjusting the distance d therebetween, while inserting the second holder 52 protruding from the second sleeve 59 into a sunken portion of the first sleeve 57 in an arrow direction. Otherwise an intended optical attenuation value can be obtained by rotating the second holder. Here, optical attenuation may occur in parts A and B of the first and second optical fibers 30a and 30b, which is negligibly small and thus causes no problem in practical use of the optical attenuator.

In the optical attenuators shown in FIGS. 5 through 8, though the axes of the optical fibers 30a and 30b are not in alignment with each other in their arrangements, it is merely an exemplary application. Thus, the axes of the optical fibers 30a and 30b may be in alignment with each other.

Further, in the optical attenuators of FIGS. 5 through 8, the back-reflection can be further reduced and refractive indexes can be preferably matched by filling index matching oil or resin in the space between the first and second optical fibers facing each other, that is, the air gap.

Figure 9A:
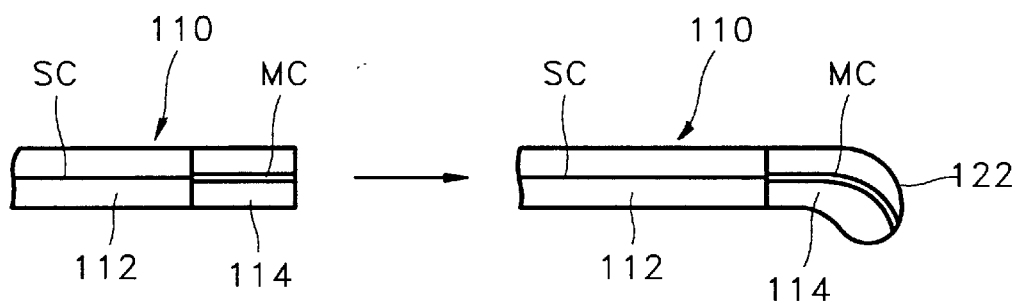
FIGS. 9A through 9C illustrate optical fibers of various shapes having non-spherical lenses of the present invention.
Figure 9B:
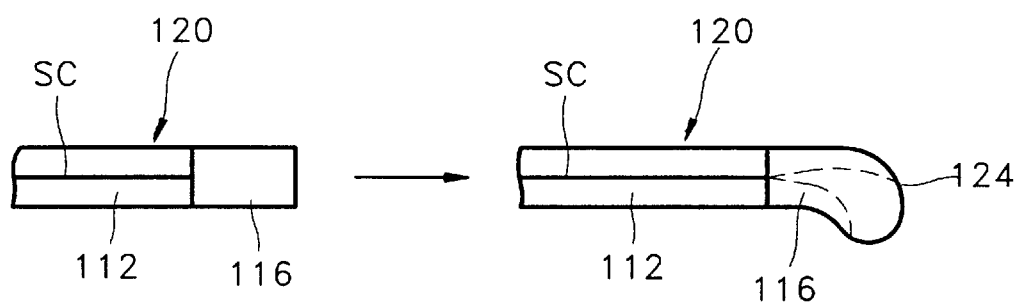
Figure 9C:
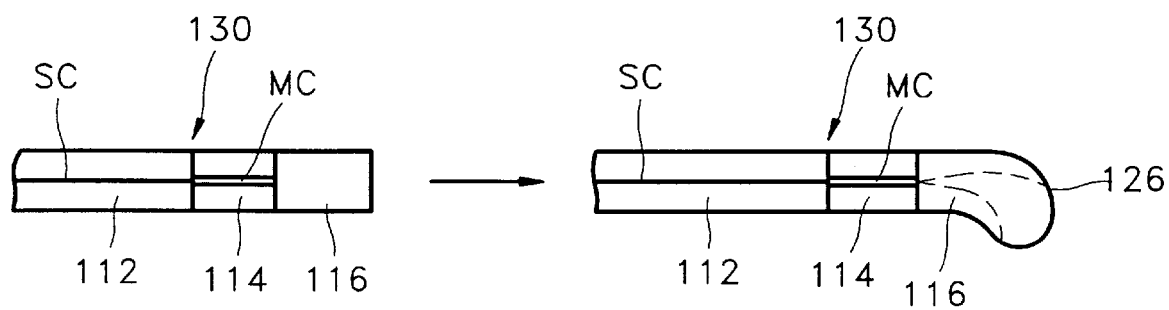

Though the non-spherical lenses 35a and 35b are single-mode or multi-mode optical fibers, the non-spherical lens of the present invention is not limited to single mode or multi-mode optical fibers. As shown in FIGS. 9A through 9C, back-reflection produced from an optical signal can be reduced by forming non-spherical lenses 122, 124, and 126 on an optical fiber 110 being a combination of a single mode optical fiber 112 and a multi-mode optical fiber 114, an optical fiber 120 being a combination of the single mode optical fiber 112 and a non-doped optical fiber 116, and an optical fiber 130 being a serial combination of the single mode optical fiber 112, the multi-mode optical fiber 114, and the non-doped optical fiber 116. Here, the difference between the single mode optical fiber 112 and the multi-mode optical fiber 114 lies in the thicknesses of their optical fiber cores SC and MC. The multi-mode optical fiber 114 having the thicker core can effect the decrease of an initial attenuation value. The non-doped optical fiber 116 has no core therein. Since the optical fibers shown in FIGS. 3 through 8 are the same except for their core thicknesses, they may be of a single mode or multi-mode. The optical fibers shown in FIGS. 9A through 9C are connected to one another by thermal fusion which is well known to those skilled in the art.

As described above, the optical attenuator of the present invention improves optical attenuation precision and avoids the impacts of back-reflection by forming the sections of optical fibers of the optical attenuator into non-spherical lenses.

What is claimed is:

1. An optical attenuator for attenuating a predetermined optical signal comprising:

a first optical fiber defining a first axis; and a second optical fiber defining a second axis, wherein sections of said first and second optical fibers which are arranged to face each other are each formed into non-spherical lenses, and wherein the first and second axes of said first and second optical fibers are not in alignment with each other.

2. An optical attenuator as claimed in claim 1, wherein an air gap exists between said first and second optical fibers.

3. An optical attenuator as claimed in claim 2, further comprising means for aligning said first and second optical fibers so that said first and second optical fibers are detached from each other to form said air gap.

4. An optical attenuator as claimed in claim 3, wherein said aligning means comprises a first supporting holder and a second supporting holder for holding said first and second optical fibers, respectively, and an aligning sleeve for surrounding said first and second supporting holders to align said optical fibers and said supporting holders.

5. An optical attenuator as claimed in claim 4, further comprising means for adjusting the distance between said non-spherical lenses of said first and second optical fibers by advancing and retreating said second supporting holder along an optical axis in said aligning means.

6. An optical attenuator as claimed in claim 5, wherein said adjusting means comprises a male screw portion fixed outside said aligning sleeve and having buttless threads, and a female screw portion having buttless threads engaged with said buttless threads of said male screw portion, so that said second supporting holder moves back and forth in said aligning sleeve by rotating said female screw portion.

7. An optical attenuator as claimed in claim 6, further comprising a flange between said second optical fiber and said female screw portion, for fixing said second supporting holder and said second optical fiber to be incorporated with each other.

8. An optical attenuator as claimed in claim 7, further comprising means for preventing rotation of said flange, which is combined with said flange and moves back and forth in a through hole formed in said male screw portion according to the rotation of said female screw portion.

9. An optical attenuator as claimed in claim 4, further comprising means for rotating said second supporting holder in said aligning sleeve.

10. An optical attenuator as claimed in claim 4, wherein said air gap between said first and second optical fibers is filled with one of air, oil, and resin.

11. An optical attenuator as claimed in claim 3, wherein said aligning means comprises a first supporting holder and a second supporting holder for holding said first and second optical fibers, respectively, a first sleeve for surrounding a portion of said first supporting holder to include said non-spherical lens of said first optical fiber, and a second sleeve for surrounding a portion of said second optical fiber to exclude said non-spherical lens of said second optical fiber, so that said second supporting holder is inserted into said first sleeve.

12. An optical attenuator as claimed in claim 1, wherein at least one of the non-spherical lenses of said first and second optical fibers is AR-coated.

13. An optical attenuator as claimed in claim 1, wherein said optical fibers are of a single mode.

14. An optical attenuator as claimed in claim 1, wherein said optical fibers are of a multi-mode.

15. An optical attenuator as claimed in claim 1, wherein said optical fibers are a combination of single mode and multi-mode optical fibers.

16. An optical attenuator as claimed in claim 1, wherein said optical fibers are a combination of single mode and non-doped optical fibers.

17. An optical attenuator as claimed in claim 1, wherein said optical fibers are a combination of single mode, multi-mode, and non-doped optical fibers.

* * * * *